(12) United States Patent
Cui et al.

(10) Patent No.: US 10,459,947 B2
(45) Date of Patent: Oct. 29, 2019

(54) FREQUENCY DEPENDENT PARTIAL INDEX

(71) Applicant: International Business Machines Corporation, Armonk, NY (US)

(72) Inventors: Kai Feng Cui, Beijing (CN); Shuo Li, Beijing (CN); Shu Hua Liu, Beijing (CN); Xin Ying Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 15/016,744

(22) Filed: Feb. 5, 2016

(65) Prior Publication Data

US 2017/0228449 A1   Aug. 10, 2017

(51) Int. Cl.
G06F 16/27 (2019.01)
G06F 16/22 (2019.01)

(52) U.S. Cl.
CPC ........ G06F 16/278 (2019.01); G06F 16/221 (2019.01); G06F 16/2228 (2019.01)

(58) Field of Classification Search
CPC ........ G06F 17/30584; G06F 17/30315; G06F 17/30321; G06F 16/278; G06F 16/221
USPC ........................................... 707/744
See application file for complete search history.

(56) References Cited

U.S. PATENT DOCUMENTS

| | | | |
|---|---|---|---|
| 8,108,355 B2 | 1/2012 | Zhang | |
| 8,560,801 B1 | 10/2013 | Pendharkar et al. | |
| 9,465,737 B1* | 10/2016 | Karmarkar | G06F 12/0802 |
| 2005/0198062 A1* | 9/2005 | Shapiro | G06F 17/30339 |
| 2006/0041533 A1* | 2/2006 | Koyfman | G06F 17/30312 |
| 2006/0085484 A1 | 4/2006 | Raizman et al. | |
| 2007/0067575 A1* | 3/2007 | Morris | G06F 12/0888 711/133 |
| 2007/0239747 A1 | 10/2007 | Pepper | |
| 2008/0098045 A1 | 4/2008 | Radhakrishnan et al. | |
| 2009/0063396 A1 | 3/2009 | Gangarapu et al. | |
| 2010/0274983 A1 | 10/2010 | Murphy et al. | |
| 2012/0072656 A1 | 3/2012 | Archak et al. | |
| 2012/0173831 A1* | 7/2012 | Rubio | G06F 3/0605 711/165 |
| 2012/0296883 A1* | 11/2012 | Ganesh | G06F 17/30315 707/693 |
| 2012/0330927 A1 | 12/2012 | Musial et al. | |
| 2013/0185503 A1* | 7/2013 | Bhatta | G06F 17/30191 711/114 |
| 2013/0347127 A1* | 12/2013 | Vedabrata | G06F 21/552 726/28 |
| 2014/0129779 A1* | 5/2014 | Frachtenberg | G06F 12/123 711/136 |
| 2015/0106383 A1* | 4/2015 | Zhang | G06F 17/3053 707/748 |

(Continued)

OTHER PUBLICATIONS

Wu, et al., "Partitioning Techniques for Fine-grained Indexing", ICDE '11 Proceedings of the 2011 IEEE 27th International Conference on Data Engineering, pp. 1127-1138.

(Continued)

*Primary Examiner* — Jensen Hu
(74) *Attorney, Agent, or Firm* — Isaac J. Gooshaw

(57) ABSTRACT

Using historical queries to determine database columns to populate a partial database. A partial database is created based, at least in part, on key values related to columns in a database for which the columns are most frequently accessed.

9 Claims, 3 Drawing Sheets

(56) References Cited

U.S. PATENT DOCUMENTS

2016/0055197 A1* 2/2016 Caro ................. G06F 17/30371
                                                        707/695
2017/0031967 A1* 2/2017 Chavan ............. G06F 17/30345
2017/0039232 A1* 2/2017 Jayanth ............. G06F 17/30345

OTHER PUBLICATIONS

Cui et al., "Frequency Dependent Partial Index", U.S. Appl. No. 15/091,911, filed Apr. 6, 2016, 25 pages.
Appendix P, List of IBM Patents or Patent Applications Treated as Related, 2 pages, dated Aug. 16, 2016.

* cited by examiner

FREQUENCY DEPENDENT PARTIAL INDEX

BACKGROUND

The present invention relates generally to the field of file management, and more particularly to indexing structure.

Database records can become extensive. Performing operations on or manipulating a large database uses significant resources and time and can affect performance of the database. For example, some operations require loading a database into a cache or a bufferpool. A bufferpool is a portion of a memory that caches data from a table and/or an index. Some of these operations include, but are not limited to: adding a record to a database; deleting a record from a database; splitting a database; and/or merging two or more databases. These operations can consume all of the cache or bufferpool resources and can slow processing. It is known to pair a database with an index of the database, which is an ordered set of pointers to the data in the database. The index can still be sufficiently large to use significant resources and/or affect performance.

SUMMARY

According to an aspect of the present invention, there is a method, computer program product, and/or system that performs the following operations (not necessarily in the following order): (i) receiving a database containing a plurality of columns; (ii) determining a key index containing a plurality of key values, wherein the plurality of key values relate to the plurality of columns; (iii) determining a set of historical queries for the database; (iv) identifying a set of columns in the plurality of columns, wherein the set of columns is accessed according to the set of historical queries; (v) adding the set of columns to a partial database; and (vi) adding a set of key values in the plurality of key values to a partial key index, wherein the set of key values relate to the set of columns. At least identifying the set of columns is performed by computer software running on computer hardware.

DETAILED DESCRIPTION

Figure 1:
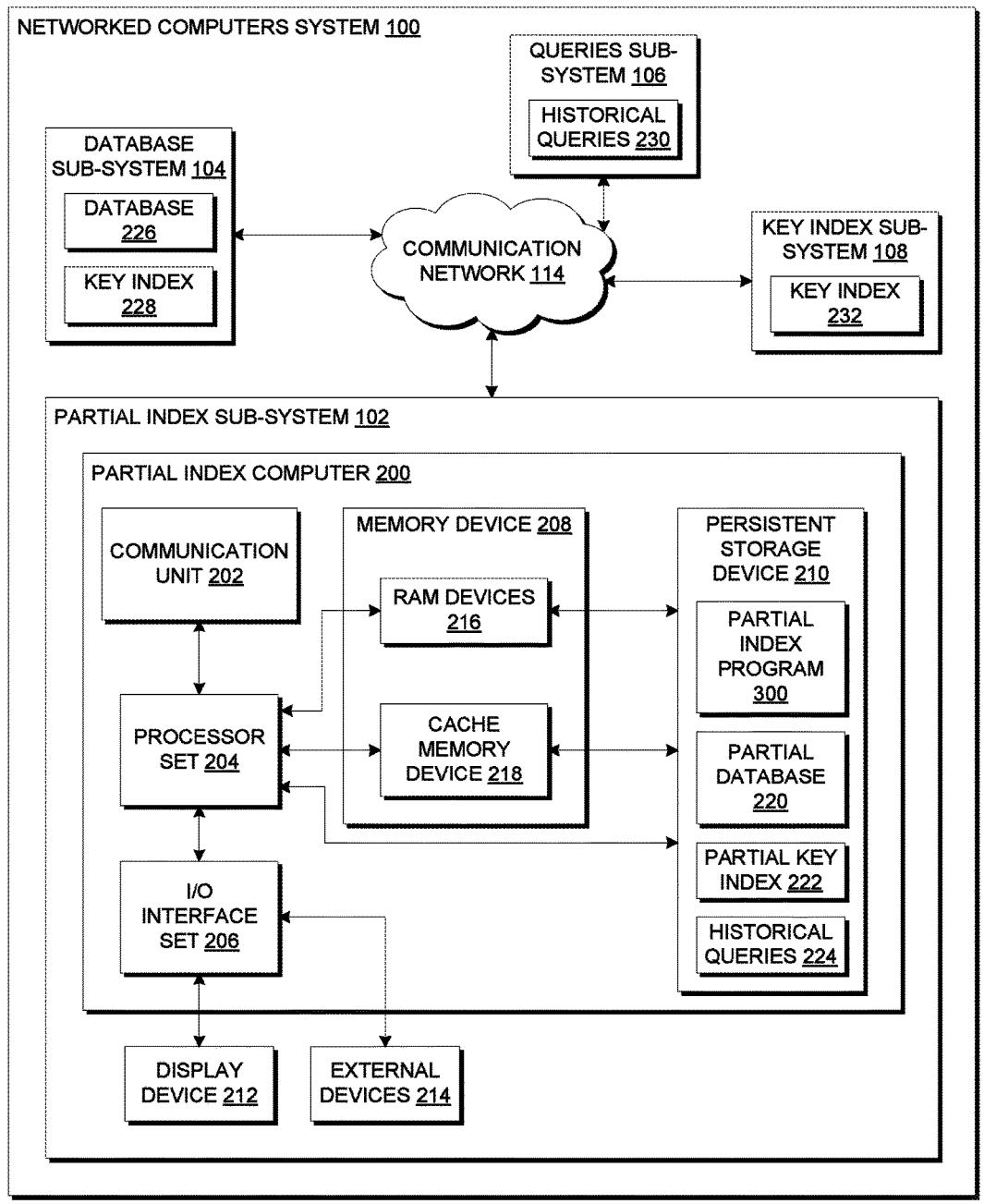
FIG. 1 is a block diagram view of a first embodiment of a system according to the present invention.

Using historical queries to determine database columns to populate a partial database. A partial database is created based, at least in part, on key values related to columns in a database for which the columns are most frequently accessed. This Detailed Description section is divided into the following sub-sections: (i) Hardware and Software Environment; (ii) Example Embodiment; (iii) Further Comments and/or Embodiments; and (iv) Definitions.

I. Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: partial index sub-system 102; database sub-system 104; database sub-system 104; queries sub-system 106; and key index sub-system 108; and communication network 114. Partial index sub-system 102 contains: partial index computer 200; display device 212; and external devices 214. Partial index computer 200 contains: communication unit 202; processor set 204; input/output (I/O) interface set 206; memory device 208; and persistent storage device 210. Memory device 208 contains: random access memory (RAM) devices 216; and cache memory device 218. Persistent storage device 210 contains: partial database 220; partial key index 222; historical queries 224; and partial index program 300. Database sub-system 104 contains: database 226; and key index 228. Queries sub-system 106 contains: historical queries 230. Key index sub-system 108 contains: key index 232.

Partial database 220 is a database (sometimes also called a table) that contains a set of frequently accessed data from a second database. In this example, partial database 220 contains a set of frequently accessed data from database 226. Partial key index 222 is an index of key values for a partial database. An index takes up storage in an index space. Each index occupies its own index space. In this example, partial key index 222 is an index of key values for partial database 220. Historical queries 224 and historical queries 230 each are sets of queries for (sometimes also called sets of requests to access) data from a database. In this example, each of historical queries 224 and historical queries 230 relate to database 226. Historical queries 224 and historical queries 230 represent alternative storage locations for a set of historical queries; however, storage for a set of historical queries is not limited to these locations. Database 226 is a database that contains a variety of data. Database 226 can reach extreme sizes. Key index 228 and key index 232 each are an index of key values for a database. In this example, each of key index 228 and key index 232 are an index of key values for database 226. Key index 228 and key index 232 represent alternative storage locations for a key index; however, storage for a key index is not limited to these locations.

Partial index sub-system 102 is, in many respects, representative of the various computer sub-systems in the present invention. Accordingly, several portions of partial index sub-system 102 will now be discussed in the following paragraphs.

Partial index sub-system 102 may be a laptop computer, a tablet computer, a netbook computer, a personal computer (PC), a desktop computer, a personal digital assistant (PDA), a smart phone, or any programmable electronic device capable of communicating with client sub-systems via communication network 114. Partial index program 300 is a collection of machine readable instructions and/or data that is used to create, manage, and control certain software functions that will be discussed in detail, below, in the Example Embodiment sub-section of this Detailed Description section.

Partial index sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between partial index sub-system 102 and client sub-systems.

Partial index sub-system 102 is shown as a block diagram with many double arrows. These double arrows (no separate reference numerals) represent a communications fabric, which provides communications between various components of partial index sub-system 102. This communications fabric can be implemented with any architecture designed for passing data and/or control information between processors (such as microprocessors, communications processors, and/or network processors, etc.), system memory, peripheral devices, and any other hardware components within a system. For example, the communications fabric can be implemented, at least in part, with one or more buses.

Memory device 208 and persistent storage device 210 are computer readable storage media. In general, memory device 208 can include any suitable volatile or non-volatile computer readable storage media. It is further noted that, now and/or in the near future: (i) external devices 214 may be able to supply some, or all, memory for partial index sub-system 102; and/or (ii) devices external to partial index sub-system 102 may be able to provide memory for partial index sub-system 102.

Partial index program 300 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage device 210.

Partial index program 300 may include both substantive data (that is, the type of data stored in a database) and/or machine readable and performable instructions. In this particular embodiment (i.e., FIG. 1), persistent storage device 210 includes a magnetic hard disk drive. To name some possible variations, persistent storage device 210 may include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer readable storage medium that is also part of persistent storage device 210.

Communication unit 202, in these examples, provides for communications with other data processing systems or devices external to partial index sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with partial index computer 200. For example, I/O interface set 206 provides a connection to external devices 214. External devices 214 will typically include devices, such as a keyboard, a keypad, a touch screen, and/or some other suitable input device. External devices 214 can also include portable computer readable storage media, such as, for example, thumb drives, portable optical or magnetic disks, and memory cards. Software and data used to practice embodiments of the present invention (e.g., partial index program 300) can be stored on such portable computer readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
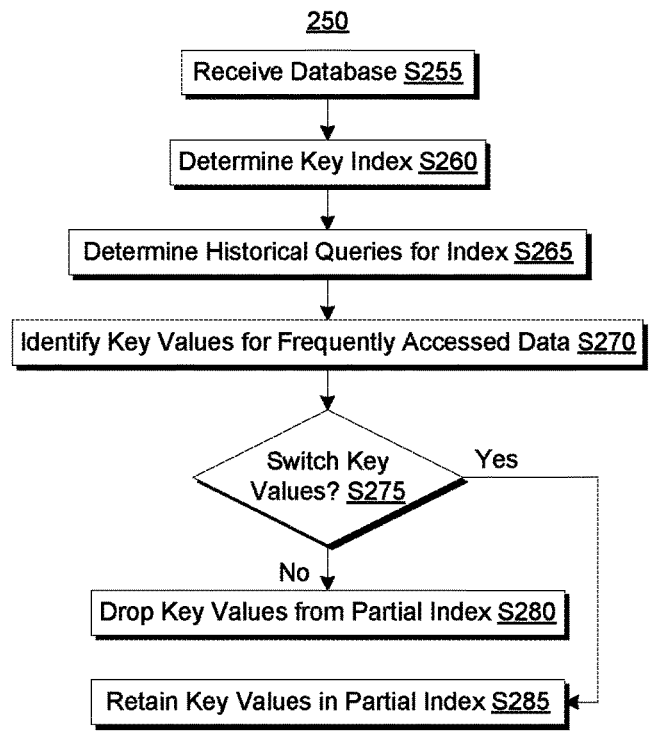
FIG. 2 is a flowchart showing a first embodiment method performed, at least in part, by the first embodiment system.
Figure 3:
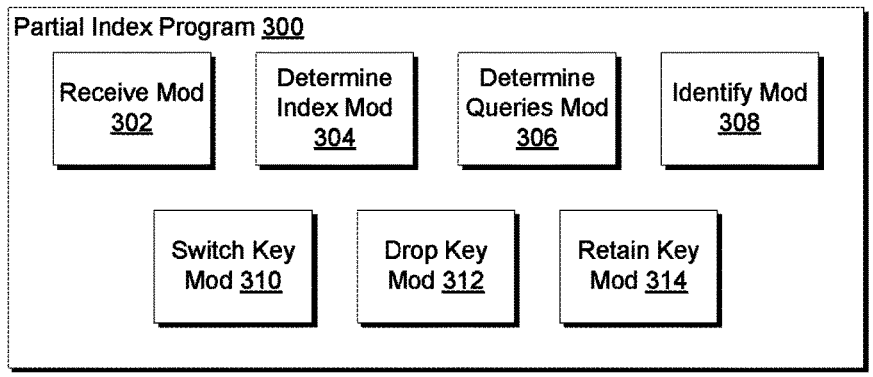
FIG. 3 is a block diagram view of a machine logic (e.g., software) portion of the first embodiment system.

FIG. 2 shows flowchart 250 depicting a method according to the present invention. FIG. 3 shows partial index program 300, which performs at least some of the method operations of flowchart 250. This method and associated software will now be discussed, over the course of the following paragraphs, with extensive reference to FIG. 2 (for the method operation blocks) and FIG. 3 (for the software blocks). In this example John wants to improve the performance of his computer in retrieving sales information from a sales table. The sales table includes sales information for every store owned by a global company. Generally, the most frequently accessed records for this table deal with larger stores in major metropolitan areas.

Processing begins at operation S255, where receive module ("mod") 302 receives a database. In this example, receive mod 302 receives database 226 from database sub-system 104. In some embodiments of the present invention, database 226 is a database. Here, database 226 contains thousands of sales records for various stores around the world. In some embodiments of the present invention, receive mod 302 receives a database as an input. In other embodiments, receive mod 302 receives a database containing numerous rows and/or columns. In some of these embodiments, receive mod 302 receives a database containing sufficient rows and/or columns to make searching the rows and/or columns inefficient. In this example, receive mod 302 receives the sales table from database sub-system 104 (maintained by John).

Processing proceeds to operation S260, where determine index mod 304 determines an index for a database. In this example, determine index mod 304 determines an index for database 226 by receiving key index 228 from database sub-system 104. In some embodiments of the present invention, determine index mod 304 determines an index for a database by identifying column and/or row headers in the database. In other embodiments, determine index mod 304 determines an index for a database by receiving the index as an input. In further embodiments, a relationship between a set of columns in a database and a set of key values in a key index is a one-to-one relationship. In this example, determine index mod 304 determines an index for the sales table received in operation S255.

Processing proceeds to operation S265, where determine queries mod 306 determines a set of historical queries for a database and/or an index. In this example, determine queries mod 306 determines a set of historical queries for database 226 and key index 228. In some embodiments of the present invention, determine queries mod 306 determines there are no historical queries for a database and/or a key index. In alternative embodiments, determine queries mod 306 stores a set of historical queries for database 226 and/or key index 228 in historical queries 224. In this example, determine queries mod 306 determines a set of historical queries for the sales database received in operation S255 based, at least in part, on information from database sub-system 104. Alternatively, determine queries mod 306 determines a set of historical queries for a sales table based, at least in part, on information from queries sub-system 106.

Processing proceeds to operation S270, where identify mod 308 identifies a set of key values for a set of frequently accessed data in a database. In this example, identify mod 308 identifies a set of key values in key index 228 that represent a set of data in a database that are most frequently accessed. In some embodiments of the present invention, identify mod 308 stores a set of identified key values in partial key index 222. In other embodiments, identify mod 308 identifies a set of key values based, at least in part, on a set of historical queries. In further embodiments, identify mod 308 identifies a set of frequently accessed data in a database. In some of these embodiments, identify mod 308 identifies a set of frequently accessed data based, at least in part on a set of historical queries determines in operation S265. In some embodiments, identify mod 308 stores a set of frequently accessed data in partial database 220. Alternatively, identify mod 308 identifies a set of key values for a set of frequently accessed data and/or identifies a set of frequently accessed data based, at least in part, on historical queries 224. In some embodiments, identify mod 308 determines a threshold level of frequency for a set of key values for a set of frequently accessed data and/or for a set of frequently accessed data. In some of these embodiments, identify mod 308 determines a threshold level of frequency as an input. Alternatively, identify mod 308 determines a threshold level of frequency as a percentage of a number of key values in key index 228. For example, key index 228 contains 100 key values; identify mod 308 identifies the five most frequently accessed key values, regardless of the number of times each key value is accessed. In some embodiments, identify mod 308 identifies a set of key values for a set of frequently accessed data in real time. Alternatively, identify mod 308 identifies a set of key values for a set of frequently accessed data in a dynamic fashion. In this example, identify mod 308 identifies the key value for the store located in New York City as a frequently accessed key value in the sales table received in operation S255.

Processing proceeds to decision operation S275, where switch key mod 310 decides whether a set of key values are frequently switched. "Switching" refers to a key value being added to a partial key index (as discussed in operation S270), then being removed from the key index; or a key value is removed, then added. A key value that is "frequently switched" is switched above a threshold amount. In this example, switch key mod 310 decides whether a set of key values in partial key index 222 switch over time. In some embodiments of the present invention, switch key mod 310 decides whether a set of key values are frequently switched in real time. Alternatively, switch key mod 310 decides whether a set of key values are frequently switched in a dynamic fashion. In other embodiments, switch key mod 310 decides a frequency based, at least in part, on an input. Alternatively, switch key mod 310 decides a frequency based, at least in part, on a predetermined threshold. If switch key mod 310 decides that some key values in partial key index 222 switch over time, processing for those key values proceeds along the "No" branch. If switch key mod 310 decides that some key values in partial key index 222 do not switch over time, processing for those key values proceeds along the "Yes" branch. For example, in the sales table, switch key mod 310 decides that sales information for a store located in New York City is frequently accessed and does not switch over time and processing proceeds along the "Yes" branch; but, switch key mod 310 decides that sales information for a store located in Austin, Tex., does switch over time, only being frequently accessed on some occasions and processing proceeds along the "No" branch. In some embodiments, processing of operation S275 operates in a dynamic manner.

Following the "No" branch from operation S275, processing terminates at operation S280, where drop key mod 312 drops a set of key values from a partial key index. In this example, drop key mod 312 drops some key values, identified in operation S275 as key values that switch over time, from partial key index 222. In some embodiments of the present invention, drop key mod 312 drops a set of data from partial database 220. For example, the key value for the store located in Austin, Tex. would be dropped from partial key index 222 and the data for that store would be dropped from partial database 220. In some embodiments, processing does not terminate at operation S280, but instead processing returns to operation S255. Alternatively, processing of flowchart 250 operates in a dynamic manner.

Following the "Yes" branch from operation S275, processing terminates at operation S285, where retain key mod 314 retains a set of key values from a partial key index. In this example, retain key mod 314 retains some key values, identified in operation S275 as key values that do not switch over time, in partial key index 222. In some embodiments of the present invention, retain key mod 314 retains a set of data from partial database 220. For example, the key value for the store located in New York City would be retained in partial key index 222 and the data for that store would be retained in partial database 220. In some embodiments, processing does not terminate at operation S285, but instead processing returns to operation S255. Alternatively, processing of flowchart 250 operates in a dynamic manner.

III. Further Comments and/or Embodiments

Some embodiments of the present invention recognize the following facts, potential problems, and/or potential areas for improvement with respect to the current state of the art: (i) accessing and/or manipulating data in a database can be resource and time intensive; and/or (ii) accessing key values in a key index can be resource and time intensive.

Figure 4:
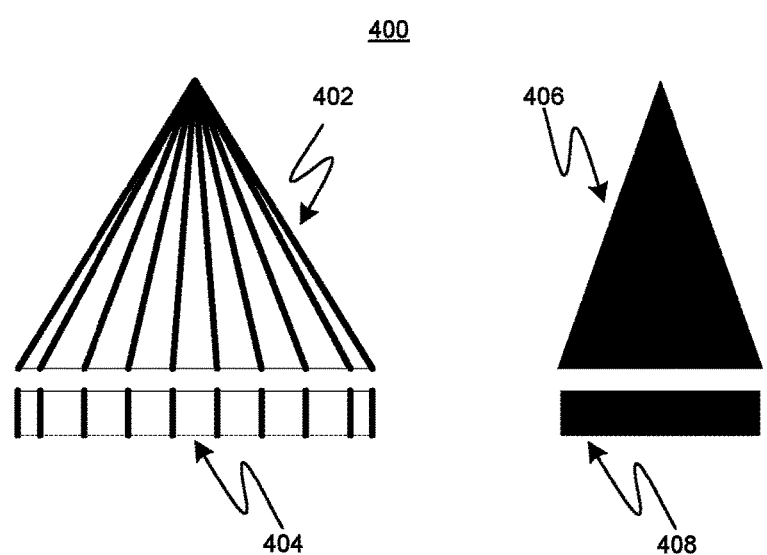
FIG. 4 depicts a storage environment of a second embodiment of a system according to the present invention.

FIG. 4 depicts storage environment 400. Storage environment 400 includes: database 402; key index 404; partial database 406; and partial key index 408.

Database 402 is a database containing unrefined data. Database 402 includes various data that are rarely accessed. Database 402 also includes data that are accessed frequently. Within database 402, data that are accessed frequently are represented as a set of solid black lines.

Key index 404 is an index of key values for various data within database 402. In some embodiments of the present invention, key index 404 includes column and/or row headers for database 402. Within key index 404, key values for data within database 402 that are frequently accessed are represented as a set of solid black lines.

Partial database 406 is a database containing refined data. Partial database 406 includes only data from database 402 that are frequently accessed.

Partial key index 408 is an index of key values for data within partial database 406. Alternatively, key values in partial key index 408 are key values from key index 404 for data in database 402 that are frequently accessed.

Some embodiments of the present invention may include one, or more, of the following features, characteristics, and/or advantages: (i) inserting data (sometimes also called records) into a database; (ii) updating an index responsive to inserting data into a database; (iii) decreasing time costs for insertion of data into a database; (iv) decreasing time costs for updating an index responsive to inserting data into a database; and/or (v) splitting a database.

Some embodiments of the present invention may include one, or more, of the following features, characteristics, and/or advantages: (i) using an index to enforce uniqueness of values in a column of a database; (ii) using an index to cluster data in a database; (iii) using an index to partition a database (sometimes also called a table); and/or (iv) using an index to provide efficient access paths to data for a set of queries.

Some embodiments of the present invention may include one, or more, of the following features, characteristics, and/or advantages: (i) basing an index on a set of data in a database; (ii) maintaining an index based, at least in part, on a database; (iii) performing maintenance on an index to improve performance; (iv) reorganizing an index; and/or (v) recovering an index.

Some embodiments of the present invention may include one, or more, of the following features, characteristics, and/or advantages: (i) decreasing time to access data in a database using an index; (ii) caching an index in a bufferpool; (iii) switching an index page in a bufferpool; and/or (iv) reducing frequency of switching an index page in a bufferpool.

Some embodiments of the present invention may include one, or more, of the following features, characteristics, and/or advantages: (i) creating a partial key index (sometimes also called a partial index) based, at least in part, on an index of a database; (ii) creating a partial key index based, at least in part, on an index of a database, to improve performance; (iii) populating a partial key index with hot keys (sometimes also called key values for frequently accessed data in a database); (iv) using hot keys, which are frequently accessed key values in an index; (v) determining that a hot key is frequently switched out of a cache; (vi) determining a set of hot keys to improve performance; and/or (vii) using a partial key index to locate data for a query.

Some embodiments of the present invention may include one, or more, of the following features, characteristics, and/or advantages: (i) an index uses a tree structure; (ii) a set of non-index pages contain a set of key values; (iii) a set of leaf pages contain columns of a database; and/or (iv) a set of leaf pages contain a set of key values.

Some embodiments of the present invention may include one, or more, of the following features, characteristics, and/or advantages: (i) receiving a query for a database; (ii) determining a column group for an index; (iii) using an index to locate a column group; (iv) using an optimizer to apply an index to a database; (v) using an optimizer to determine whether a include a key index in a partial key index; (vi) recording a frequency of access for a set of key values; (vii) recording a frequency of access for a set of key values as a set of historical queries (sometimes also called a status record); (viii) monitoring a frequency of index pages switched out of a bufferpool; (ix) adding a key value to a partial key index; (x) adding a sub-record (sometimes also called a datum in a database) to a partial database; (xi) dropping a key value from a partial key index; and/or (xii) dropping a sub-record from a partial database.

Some embodiments of the present invention may include one, or more, of the following features, characteristics, and/or advantages: (i) binding a set of key values to a set of columns (sometimes also called a column group); (ii) analyzing a query for a column group; (iii) including a field key in a partial key index; (iv) analyzing a column group; and/or (v) building a partial key index based, at least in part, on a set of field keys. A field key is a key value for a column that is accessed wherein the key value is not in a partial key index. A column group is a set of columns that usually appear together in response to a query.

Some embodiments of the present invention may include one, or more, of the following features, characteristics, and/or advantages: (i) improving access performance for a query; (ii) building a partial key index based, at least in part, on a field key; (iii) sorting a partial key index based, at least in part, on a key index; (iv) retaining a set of record keys (sometimes also called a key value in a key index) in a partial key index; (v) adjusting a partial key index based, at least in part, on access frequency of key values in a partial key index; and/or (vi) removing a set of field columns from a partial key index.

Some embodiments of the present invention may include one, or more, of the following features, characteristics, and/or advantages: (i) using a query-predicate pattern to determine a column group in a database; (ii) monitoring switching events for index pages; (iii) improving query performance for databases and/or key indices; (iv) retrieving a set of index pages from a memory; and/or (v) retrieving a set of index pages from a memory if the set of index pages are not in a bufferpool.

Some embodiments of the present invention may include one, or more, of the following features, characteristics, and/or advantages: (i) retrieving a column group from an index; (ii) retrieving a column group from a database; (iii) determining a column group based, at least in part on a query-predicate pattern and/or a set of prior results; (iv) recording a frequency of access for a set of key values in a key index; (v) building a partial key index based, at least in part, on a set of most frequently accessed key values; (vi) retaining a set of non-leaf pages in a bufferpool; (vii) placing a set of key values for a set of frequently accessed columns in a partial key index; (viii) placing a set of frequently accessed columns in a partial database; and/or (ix) creating a set of leaves in a partial key index for a set of key values for a set of frequently accessed columns.

Some embodiments of the present invention may include one, or more, of the following features, characteristics, and/or advantages: (i) monitoring a set of key values in a key index that are frequently switched in a bufferpool; (ii) dropping a set of key values from a key index that are not frequently queried; (iii) improving a hit ratio of a set of key values in a partial key index; (iv) improving a hit ratio of a set of key values in a partial key index versus a hit ratio of a set of key values in a key index; (v) reducing an occupancy of a bufferpool; (vi) reducing an occupancy of a bufferpool based, at least in part, on a size of a partial key index versus a size of a key index.

IV. Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Electrically connected" means either indirectly electrically connected such that intervening elements are present or directly electrically connected. An "electrical connection" may include, but need not be limited to, elements such as capacitors, inductors, transformers, vacuum tubes, and the like.

"Mechanically connected" means either indirect mechanical connections made through intermediate components or direct mechanical connections. "Mechanically connected" includes rigid mechanical connections as well as mechanical connection that allows for relative motion between the mechanically connected components. "Mechanically connected" includes, but is not limited to: welded connections; solder connections; connections by fasteners (e.g., nails, bolts, screws, nuts, hook-and-loop fasteners, knots, rivets, quick-release connections, latches, and/or magnetic connections); force fit connections; friction fit connections; connections secured by engagement caused by gravitational forces; pivoting or rotatable connections; and/or slidable mechanical connections.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

"Automatically" means "without any human intervention."

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A method comprising:
receiving, by one or more processors, a database containing a plurality of columns;
determining, by the one or more processors, a key index for the database, wherein the key index includes a plurality of pointers to a plurality of records of the database;
determining, by the one or more processors, one or more access frequency values for columns associated with the key index;
determining, by the one or more processors, for a plurality of key values in the key index, a frequency of switching of a given key value in a given column associated with the key index to a column associated with a partial key index, wherein switching includes both of (i) an addition of the given key value to a column of the partial key index and (ii) a removal of the given key value from the column associated with the key index;
generating, by the one or more processors, the partial key index based, at least in part, on (a) the one or more access frequency values for the columns in the key index; and (b) respective frequency of switching of key values for the columns in the key index, wherein the partial key index includes a subset of pointers from the plurality of pointers of the key index; and
generating, by the one or more processors, a partial database based on the partial key index, wherein the partial database includes a subset of rows from the database.

2. The method of claim 1, further comprising:
removing, responsive to receiving an access threshold as an input, a second set of columns from the partial index, wherein a set of access frequency values associated with the second set of columns are below the access threshold.

3. The method of claim 2, wherein the access threshold is one percent of the set of historical queries.

4. A computer program product comprising:
one or more computer-readable storage media and program instructions stored on the one or more computer-readable storage media, the program instructions comprising:
program instructions to receive a database containing a plurality of columns;
program instructions to determine a key index for the database, wherein the key index includes a plurality of pointers to a plurality of records of the database;
program instructions to determine one or more access frequency values for columns associated with the key index;
program instructions to determine for a plurality of key values in the key index, a frequency of switching of a given key value in a given column associated with the key index to a column associated with a partial key index, wherein switching includes both of (i) an addition of the given key value to a column of the partial key index and (ii) a removal of the given key value from the column associated with the key index;
program instructions to generate the partial key index based, at least in part, on (a) the one or more access frequency values for the columns in the key index; and (b) respective frequency of switching of key values for the columns in the key index, wherein the partial key index includes a subset of pointers from the plurality of pointers of the key index; and
program instructions to generate a partial database based on the partial key index, wherein the partial database includes a subset of rows from the database.

5. The computer program product of claim 4, the program instructions further comprising:
program instructions to remove, responsive to receiving an access threshold as an input, a second set of columns from the partial key index, wherein a set of access frequency values associated with the second set of columns are below the access threshold.

6. The computer program product of claim 5, wherein the access threshold is one percent of the set of historical queries.

7. A computer system comprising:
one or more computer processors;
one or more computer readable storage media; and
program instructions stored on the computer readable storage media for execution by at least one of the one or more processors, the program instructions comprising:
program instructions to receive a database containing a plurality of columns;
program instructions to determine a key index for the database, wherein the key index includes a plurality of pointers to a plurality of records of the database;
program instructions to determine one or more access frequency values for columns associated with the key index;
program instructions to determine for a plurality of key values in the key index, a frequency of switching of a given key value in a given column associated with the key index to a column associated with a partial key index, wherein switching includes both of (i) an addition of the given key value to a column of the partial key index and (ii) a removal of the given key value from the column associated with the key index; and
program instructions to generate the partial key index based, at least in part, on (a) the one or more access frequency values for the columns in the key index; and (b) respective frequency of switching of key values for the columns in the key index, wherein the partial key index includes a subset of pointers from the plurality of pointers of the key index; and
program instructions to generate a partial database based on the partial key index, wherein the partial database includes a subset of rows from the database.

8. The computer system of claim 7, further comprising:
program instructions to remove, responsive to receiving an access threshold as an input, a second set of columns from the partial key index, wherein a set of access frequency values associated with the second set of columns are below the access threshold.

9. The computer system of claim 8, wherein the access threshold level is one percent of the set of historical queries.

* * * * *